United States Patent
McConnell (10) Patent No.: US 11,347,736 B2
(45) Date of Patent: May 31, 2022

(54) DYNAMIC QUERY OPTIMIZATION

(71) Applicant: Boray Data Technology Co. Ltd., Beijing (CN)

(72) Inventor: Richard McConnell, Las Vegas, NV (US)

(73) Assignee: Boray Data Technology Co. Ltd., Beijing (CN)

(*) Notice: Subject to any disclaimer, the term of this patent is extended or adjusted under 35 U.S.C. 154(b) by 0 days.

(21) Appl. No.: 17/070,662

(22) Filed: Oct. 14, 2020

(65) Prior Publication Data

US 2021/0133193 A1 May 6, 2021

Related U.S. Application Data (60) Provisional application No. 62/928,108, filed on Oct. 30, 2019.

(51) Int. Cl.
*G06F 17/30* (2006.01)
*G06F 16/2453* (2019.01)
*G06N 20/00* (2019.01)

(52) U.S. Cl.
CPC ....... *G06F 16/24542* (2019.01); *G06N 20/00* (2019.01)

(58) Field of Classification Search
CPC ......... G06F 16/24542; G06F 16/24545; G06F 16/13; G06F 16/24; G06F 16/156; G06N 20/00; G06N 3/00; G06N 5/00; G05B 13/00
See application file for complete search history.

(56) References Cited

U.S. PATENT DOCUMENTS 9,177,021 B2 * 11/2015 Kaufmann ........ G06F 16/24534
2002/0198867 A1 * 12/2002 Lohman ............ G06F 16/24549
2003/0088579 A1 * 5/2003 Brown .................. G06F 16/284
(Continued)

FOREIGN PATENT DOCUMENTS

WO 2011/130706 A2 10/2011
WO 2018/049380 A1 3/2018

OTHER PUBLICATIONS

Lee et al., "AJIT Compilation-based Unified SQL Query Optimization System", 2016, IEEE. (Year: 2016).*
(Continued)

*Primary Examiner* — Hung D Le
(74) *Attorney, Agent, or Firm* — Shumaker & Sieffert, P.A.

(57) ABSTRACT

In general, this disclosure describes techniques for dynamically optimizing queries. For example, a query system includes an interface configured to receive a query to access first data stored in a plurality of data sources. The query system includes a plurality of connector interfaces for interfacing with the plurality of data sources. The query system also includes a compiler configured to compile the query to generate a compiled query that includes one or more instructions for obtaining, as the compiled query is executed, one or more metrics for executions of portions of the compiled query at one or more of the data sources. The query system also includes an optimizer configured to optimize, in response to the interface receiving a subsequent query to access second data stored in the plurality of data sources, a query plan for the subsequent query based on the one or more metrics.

20 Claims, 7 Drawing Sheets

(56) References Cited

U.S. PATENT DOCUMENTS

| | | | | |
|---|---|---|---|---|
| 2004/0225639 | A1* | 11/2004 | Jakobsson | G06F 16/24549 |
| 2004/0249810 | A1* | 12/2004 | Das | G06F 16/2462 |
| 2005/0222093 | A1* | 10/2005 | Pearlman | A61P 25/28 514/114 |
| 2005/0228779 | A1* | 10/2005 | Chaudhuri | G06F 16/24545 |
| 2008/0059125 | A1* | 3/2008 | Fraser | G06F 17/18 702/189 |
| 2008/0195577 | A1* | 8/2008 | Fan | G06F 16/24545 |
| 2008/0306903 | A1* | 12/2008 | Larson | G06F 16/2462 |
| 2010/0082507 | A1 | 4/2010 | Ganapathi et al. | |
| 2010/0169345 | A1 | 7/2010 | Boldyrev et al. | |
| 2011/0010359 | A1* | 1/2011 | Burger | G06F 16/24542 707/718 |
| 2011/0010361 | A1* | 1/2011 | Burger | G06F 16/24542 707/719 |
| 2011/0029508 | A1* | 2/2011 | Al-Omari | G06F 16/24542 707/718 |
| 2011/0060731 | A1 | 3/2011 | Al-omari et al. | |
| 2011/0082856 | A1 | 4/2011 | Subbiah et al. | |
| 2014/0181078 | A1 | 6/2014 | Ghazal et al. | |
| 2014/0278754 | A1* | 9/2014 | Cronin | G06Q 30/0201 705/7.29 |
| 2014/0365533 | A1 | 12/2014 | Debray et al. | |
| 2015/0142775 | A1 | 5/2015 | Kang et al. | |
| 2017/0083573 | A1* | 3/2017 | Rogers | G06F 16/9535 |
| 2017/0177668 | A1* | 6/2017 | Li | G06F 16/24547 |
| 2017/0228425 | A1* | 8/2017 | Kandula | G06N 7/005 |
| 2018/0293275 | A1* | 10/2018 | P | G06F 16/258 |
| 2018/0336262 | A1 | 11/2018 | Ghazal | |
| 2019/0005092 | A1* | 1/2019 | Le | G06F 16/24535 |

OTHER PUBLICATIONS

Li et al., "Adaptively Reordering Joins during Query Execution", 2007, IEEE. (Year: 2007).*

Papadimitriou et al., "Multiobjective Query Optimization", 2001, ACM. (Year: 2001).*

EsperTech, "Esper-8 Compiler and Runtime" Oct. 23, 2018, retrieved from https://www.espertech.com/2018/10/23/esper-8-compiler-and-runtime/, retrieved on Nov. 11, 2020, pp. 3.

Bernhardt, "Compiling Streaming SQL to Byte Code With Esper Version 8.0.0" retrieved from "https://dzone.com/articles/compiling-streaming-sql-to-byte-code-with-esper-ve", Dec. 20, 2018, retrieved on Nov. 11, 2020, pp. 3.

EsperTech Inc., "Esper Reference: Chapter 15. Compiler Reference" retrieved from http://esper.espertech.com/release-8.1.0/reference-esper/html/apicompiler.html#apicompiler-optimizations, Feb. 26, 2019, retrieved on Nov. 11, 2020, pp. 17.

EsperTech Inc., "Esper Reference: Chapter 16. Runtime Reference" retrieved from http://esper.espertech.com/release-8.1.0/reference-esper/html/apiruntime.html#apiruntime-instrumentation-runtimemetrics, Feb. 26, 2019, retrieved on Nov. 11, 2020, pp. 43.

Adamo, "Introducing Snel: a columnar database featuring Just-In-Time query compilation for fast on-line analytics", retrieved from "https://medium.com/grandata-engineering/introducing-snel-a-columnar-just-in-time-query-compiler-for-fast-on-line-analytics-9cf561f82526" Oct. 18, 2017, pp. 9.

Zhang et al., "Micro-Specialization: Dynamic Code Specialization of Database Management Systems", ResearchGate, retrieved from https://www2.cs.arizona.edu/~debray/Publications/zhang_cgo2012.pdf, May 2012, pp. 11.

Fegaras, "Compile-Time Query Optimization for Big Data Analytics", Open Journal of Big Data, vol. 5, Issue 1, 2019, pp. 35-61.

Vigias, "Just-in-time compilation for SQL query processing", Proceedings of the VLDB Endowment, vol. 6, No. 11, Aug. 2013, pp. 2.

Esper Compiler 8.1.0 API, retrieved from http://esper.espertech.com/release-8.1.0/javadoc-compiler/index.html, retrieved on Dec. 1, 2020, p. 1.

International Search Report and Written Opinion of International Application No. PCT/US2020/058024, dated Feb. 5, 2021, 16 pp.

* cited by examiner

DYNAMIC QUERY OPTIMIZATION

This application claims the benefit of U.S. Provisional Patent Application No. 62/928,108 filed on Oct. 30, 2019, the entire contents of which is incorporated by reference herein.

TECHNICAL FIELD

The disclosure relates to a computing system, and in particular, to optimizing queries in a computing system.

BACKGROUND

Data is stored in repositories, such as databases. Data is stored in different types of databases, such as relational databases, non-relational databases, streaming databases and others. For example, relational databases store data as rows and columns in a series of related tables. In contrast, non-relational databases store data based on models other than tabular relations. For example, non-relational databases may include document databases, key-value stores, graph stores, and column stores.

A query is used to access (e.g., write and retrieve) data stored in databases. Depending on the type of database, different querying languages are used to access the data stored in the databases. For example, a user may use a relational database query (e.g., Structured Query Language (SQL)) for querying a relational database. The relational database query may return rows of the relational databases. Alternatively, a user may use a non-relational database query (e.g., NoSQL) for querying a non-relational database, such as a document database. The non-relational database query may return, for example, a document containing the data, such as a JavaScript Object Notation (JSON) or eXtensible Markup Language (XML) document. Other data repositories include data lakes, static web pages, data streams, files stored to file systems, and others.

SUMMARY

In general, this disclosure describes techniques for dynamically optimizing queries. For example, a query system may access a plurality of heterogenous data sources storing data needed to satisfy queries received by the query system. The query system includes a common interface for receiving queries and adaptively pushes down queries to retrieve data from the heterogenous data sources. The query system may dynamically measure or otherwise obtain one or more metrics based on attributes of the queries or execution of the queries at different data sources. Using the metrics, the query system may optimize the queries or subsequent queries. For example, a query compiler of the query system may use a Just-in-Time (JIT) or other compiler to compile a current or subsequent query into bytecode that may optimize the current or subsequent query based on attributes of the query or the most up-to-date metrics for query execution at the various data sources, thereby dynamically adapting query compilation to, for instance, dynamic resource or network conditions that affect query execution or data retrieval from the data sources. In this way, in some examples of the techniques, the query system can perform JIT compilation, optimized specific to the query or the data sources based on attributes of the query or metrics indicating performance of previous queries at multiple data sources, at least in part because the compilation of the query occurs just before execution.

In some examples, an optimizer of the query system may instruct a compiler to add instrumentation code (e.g., a counter) when compiling a query to obtain one or more metrics as the compiled query is executed. Metrics may include a size of operands (e.g., number of rows returned from query), selectivity of predicates, cardinalities from tables, or other metrics resulting from the execution of a compiled query. In response to receiving a subsequent query, the optimizer may cause the query system to optimize the subsequent query based on the metrics for the previously executed query.

The techniques described herein may provide one or more technical advantages that provide at least one practical application. For example, the techniques described in this disclosure blends the use of coarser hash lookup techniques to produce an effect that ranges from conventional cost-based optimization (when high-confidence statistics are available or have been acquired), through "softer" learned models (based on metrics acquired from past similar queries), and to low-confidence "hunches" based more or less on examination of the query itself and applying some general rules.

In one example, the techniques described herein include a method performed by a query system, the method comprising: receiving a query to access first data stored in a plurality of data sources; compiling the query to generate a compiled query that includes one or more instructions for obtaining, as the compiled query is executed, one or more metrics for executions of portions of the compiled query at one or more of the data sources; receiving a subsequent query to access second data stored in the plurality of data sources; and optimizing a query plan for the subsequent query based on the one or more metrics.

In another example, the techniques described herein include a query system comprising: an interface configured to receive a query to access first data stored in a plurality of data sources; a plurality of connector interfaces for interfacing with the plurality of data sources; a compiler configured to compile the query to generate a compiled query that includes one or more instructions for obtaining, as the compiled query is executed, one or more metrics for executions of portions of the compiled query at one or more of the data sources; and an optimizer configured to optimize, in response to the interface receiving a subsequent query to access second data stored in the plurality of data sources, a query plan for the subsequent query based on the one or more metrics.

In another example, the techniques described herein include a non-transitory computer-readable medium comprising instructions for causing one or more programmable processors to: receive a query to access first data stored in a plurality of data sources; compile the query to generate a compiled query that includes one or more instructions for obtaining, as the compiled query is executed, one or more metrics for executions of portions of the compiled query at one or more of the data sources; receive a subsequent query to access second data stored in the plurality of data sources; and optimize a query plan for the subsequent query based on the one or more metrics.

For example, the techniques may enable the query system to optimize the queries using the most up-to-date metrics for query execution at the various data sources accessed by the query system. Dynamically adapting query compilation to, for instance, acquire information from running queries (or from assumptions based on the queries themselves or attributes of data sources) may improve performance of the query system, such as by intelligently applying or arranging joins or other operations and/or aspects of query execution among the data sources using the acquired information. As another example, by adding instrumentation code to a query to obtain one or more metrics for the query, the techniques may dynamically obtain metrics as queries are executed without relying on histograms or sending additional queries requesting for metrics of databases. This may facilitate the query system having access to the most up-to-date metrics for query execution, may provide access to metrics not available using conventional database or other data source metric requests, may reduce a processing burden on the query system and/or the data sources, and/or may reduce communication traffic in the network.

The details of one or more examples are set forth in the accompanying drawings and the description below. Other features, objects, and advantages will be apparent from the description and drawings, and from the claims.

DETAILED DESCRIPTION

Figure 1:
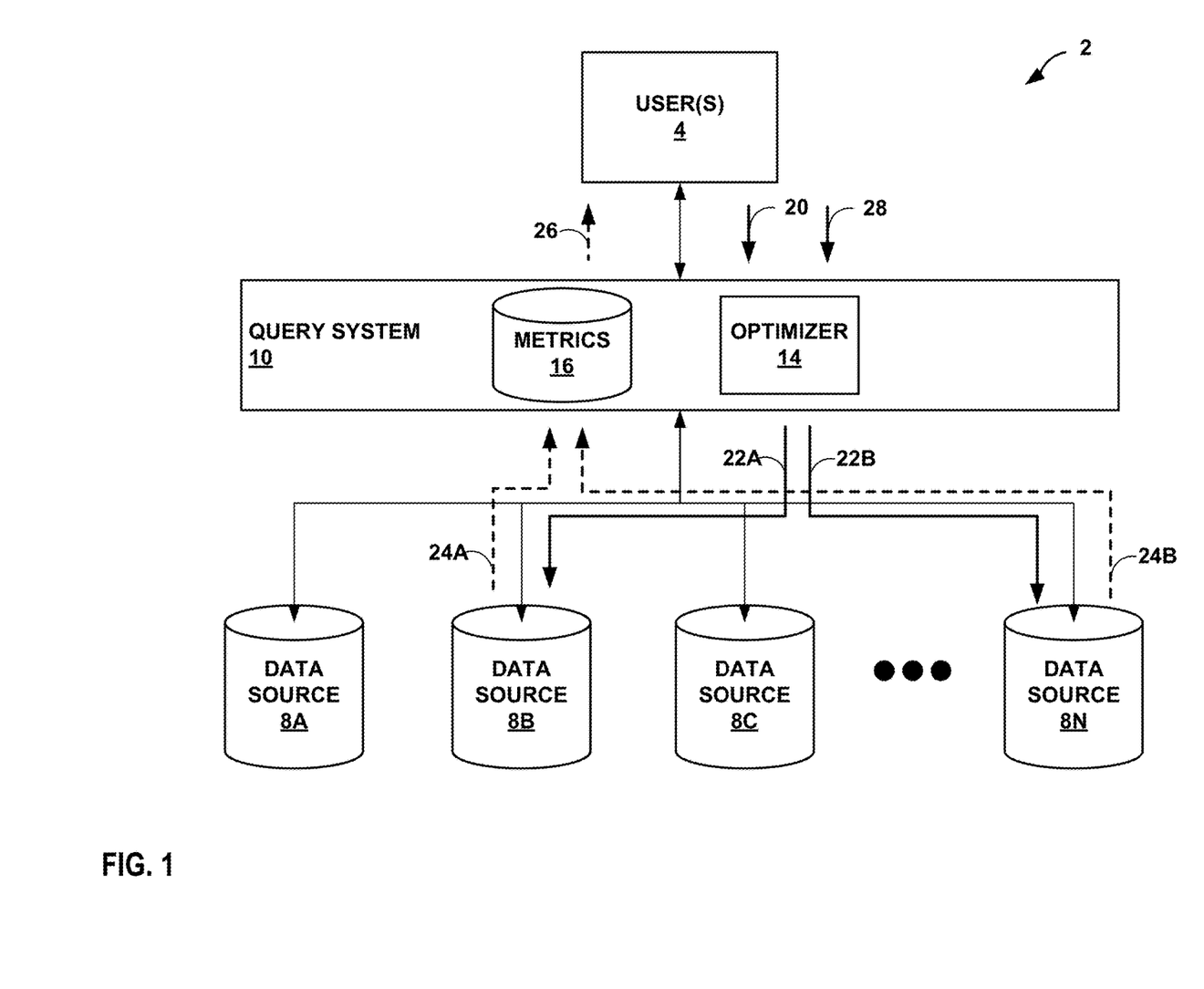
FIG. 1 is a block diagram illustrating an example computing system configured for dynamically optimizing queries for a plurality of data sources, in accordance with one or more aspects of the techniques disclosed.

FIG. 1 is a block diagram of an example computing system 2 configured to dynamically optimize queries for a plurality of data sources, in accordance with one or more aspects of the techniques disclosed. In this example, computing system 2 includes a query system 10 configured to provide a unified access to data sources 8A-8N (collectively, "data sources 8"). In some examples, data sources 8 may represent heterogenous data sources. In some examples, query system 10 is implemented by a plurality of distributed nodes, as further described below.

Data sources 8 may include relational databases, non-relational databases, data streams, files systems such as Hadoop Distributed File System (HDFS), data lakes, web pages, or any other type of repository or source of data accessible by query system 10 satisfying queries. Relational databases may store data as rows and columns in a series of related tables. In contrast, non-relational databases store data based on models other than tabular relations. For example, non-relational databases may include document databases, key-value stores, graph stores, and column stores. In some examples, data sources 8 are distributed. In some examples, one or more of data sources 8 may be external to query system 10. In some example, one or more of data sources 8 may be internal to query system 10, such as an in-memory data store that stores data in a shared memory with other components of query system 10.

Query system 10 may adapt queries for running against heterogenous data sources 8. Query system 10 may reformulate one or more queries from one or more users, e.g., users 4, to access data stored in a plurality of heterogenous data sources 8. The queries may be, for instance, neutral dialect such as Structured Query Language (SQL). As one example, in response to receiving a query from user 4, query system 10 may determine one or more types of data is to be accessed and processed, and locations in which the data is stored. For example, the query system 10 may determine that the query requests data stored in a relational database (e.g., data source 8A) and a non-relational database (e.g., data source 8B). Query system 10 may compile the query (or a portion of the query) as respective sub-queries of the query to access data from a corresponding one of data sources 8. For example, to extract the data stored in relational database 8A, query system 10 may compile the query (or a portion of the query) to generate a relational database query (a sub-query of the query) to retrieve the data (e.g., rows of tables) from relational database 8A. Relational database queries may include SQL queries, for instance. Query system 10 may also compile the query (or a portion of the query) as a non-relational database query (a sub-query of the query) to retrieve the data from non-relational database 8B (e.g., document such as a JavaScript Object Notation (JSON) or eXtensible Markup Language (XML) document). Non-relational database queries may include NoSQL queries, for instance.

In general, to compile a received query, query system 10 generates a query plan (or "execution plan") as a set of steps or tasks for obtaining and processing data stored in data sources 8. The query plan includes sub-queries to access one or more of data sources 8. Query system 10 may distribute the sub-queries generated for a query in parallel to multiple data sources 8. Each of data sources 8 that receives a sub-query accesses and/or processes its corresponding stored data to satisfy the sub-query and return sub-query result data. Query system 10 may receive the sub-query result data separately returned from one or more of data sources 8 and integrate the data for user 4. Query system 10 may perform further query processing operations on the separate sub-query result data returned from one or more data sources 8. For example, query system 10 may perform a join or other operation on a table of the sub-query result data. As other examples, query system 10 may aggregate, modify, analyze, compute, or otherwise process the sub-query result data returned to generate a overall query result responsive to the query.

In accordance with the techniques described herein, query system 10 includes optimizer 14 to dynamically optimize queries. In the illustrated example of FIG. 1, query system 10 may receive a query 20 from user 4 to access data stored in one or more of data sources 8. In response to receiving query 20 from user 4, query system 10 may determine one or more types of data is to be accessed and processed, and locations in which the data is stored. For example, the query system 10 may determine that query 20 requests data stored in data source 8B and a data source 8N. To extract data stored in data sources 8B and 8N, query system 10 may compile query 20 to generate a compiled query to access one or more of data sources 8. More specifically, query system 10 may compile query 20 to generate a query plan to obtain and process data stored in data sources 8. The query plan for query 20 includes sub-queries 22A-22B (collectively, "sub-queries 22") to access one or more of data sources 8. In some examples, query system 10 may dynamically measure or otherwise obtain one or more metrics based on execution of the sub-queries 22 at data sources 8B and 8N. For example, optimizer 14 may cause query system 10 to add instrumentation code when compiling query 20 to obtain one or more metrics as the compiled queries (e.g., sub-queries 22) are executed.

Metrics may include size of operands, selectivity of predicates, cardinality of tables or columns, performance and execution metrics such as query latency or CPU usage, and other metrics resulting from the execution of the queries.

Size of operands may include the fetching size of a query or sub-query. As one example, optimizer 14 may cause query system 10 to add a counter to a relational database query to count each row of a table returned from a relational database. In some examples, optimizer 14 may cause query system 10 to add a counter to a query to count each array of elements or nested arrays from a document stored in a non-relational database. In response to direction from optimizer 14 in the above examples, query system 10 may dynamically generate query execution code that includes instructions and data for accomplishing such a counter.

In some examples, metrics may include information on the selectivity of predicates. A predicate may define a condition applied to rows in a table. Selectivity of a predicate is a subset of a data set identified by the predicate. For example, optimizer 14 may instruct query system 10 to add a counter to a query to count each row returned based on a predicate (e.g., customers under the age of 21 from a data set of customers of all ages). In response to direction from optimizer 14 in the above example, query system 10 may update or generate query execution code that includes instructions and data for accomplishing such a counter to obtain information on the selectivity of a predicate.

Cardinality of tables is the uniqueness of data contained in a column of a table. To measure cardinality of tables, optimizer 14 may, for example, instruct query system 10 to add a counter to the query to count each duplicated entry in a column of a table (e.g., customers located in a particular state). The number of duplicated entries may represent the degree of cardinality. For example, the greater number of duplicated entries in a column of a table, the lower the cardinality, whereas the fewer number of duplicated entries in a column of a table, the higher the cardinality. In response to direction from optimizer 14 in the above examples, query system 10 may update or generate query execution code that includes instructions and data for accomplishing such a counter to obtain information on the above-described metrics.

Query system 10 receives the returned sub-query result data 24A-24B (collectively, "result data 24), including one or more metrics. The obtained metrics are stored in metrics repository 16 ("metrics 16"), which may include an in-memory, off-memory, local or remote storage. In some examples, metrics repository 16 is a distributed information base. Query system 10 integrates result data 24 (e.g., integrated result data 26) for user 4.

When query system 10 receives a subsequent query 28 from user 4 to access data stored in one or more of data sources 8, query system 10 may optimize the subsequent query based on one or more metrics dynamically obtained from execution of sub-queries 22. To optimize subsequent query 28, query system 10 may compile subsequent query 28 to generate a query plan for subsequent query 28 that differs from a query plan that query system 10 would generate absent the metrics. For example, based on a dynamically-obtained metric for data source 8B and/or data source 8N, query system 10 may: (1) select a particular data source 8 for a data set; (2) determine a type or ordering of tasks within a sub-query sent to a data source 8; (3) determine to process one or more tasks for a query by query system 10 rather than by a data source 8; (4) determine an ordering of tasks for a query or sub-query, such as join operations; (5) determine whether to condense operators for a query or sub-query; (6) or other determinations that affects the query plan and the compiled query generated by the query system 10, such as to selectively determine whether to push a join operand to the data source.

As one example (and as further described with respect to FIGS. 3A-3C), optimizer 14 may cause query system 10 to reorder the join operands of the query plan based on metrics acquired from data sources 8 learned from the execution of sub-queries 22. For example, optimizer 14 may reorder join operands of the query plan for subsequent query 28 to first process a join operand for tables with the smallest table size (e.g., least number of rows) and then process a join operand for tables with the largest table size (e.g., highest number of rows).

In this way, by adapting query compilation to acquire information from running queries (or from assumptions based on the queries themselves or attributes of data sources) and by intelligently applying or arranging joins or other operations and/or aspects of query execution among the data sources using the acquired information, the performance of the query system may be improved. As another example, by adding instrumentation code to a query to obtain one or more metrics for the query, the techniques may dynamically obtain metrics as queries are executed without relying on histograms or sending additional queries requesting for metrics of databases. This may facilitate the query system having access to the most up-to-date metrics for query execution, may provide access to metrics not available using conventional database or other data source metric requests, may reduce a processing burden on the query system and/or the data sources, and/or may reduce communication traffic in the network.

Figure 2:
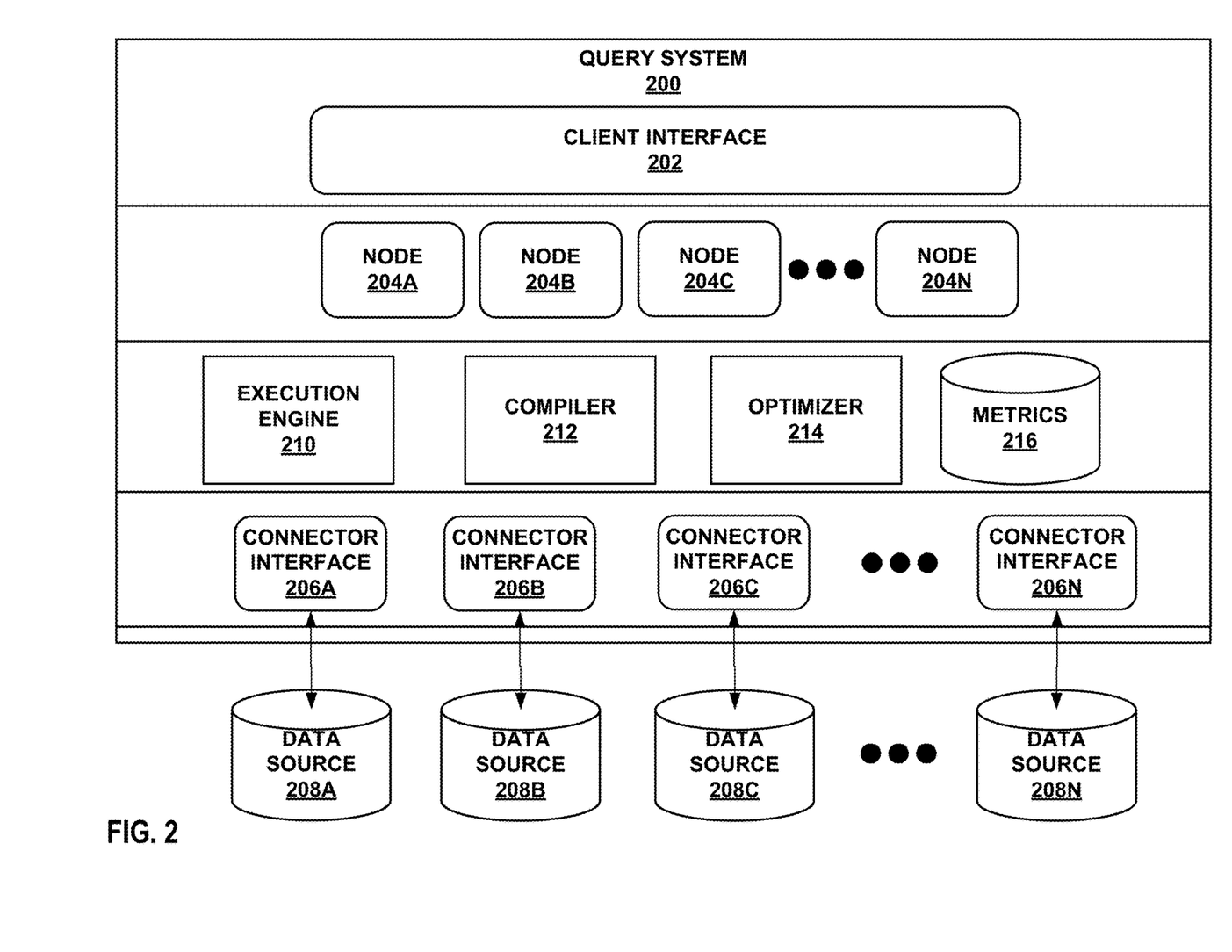
FIG. 2 is a block diagram illustrating the query system in further detail, in accordance with one or more aspects of the techniques disclosed.

FIG. 2 is a block diagram of the query system 10 of FIG. 1 in further detail, in accordance with one or more aspects of the techniques disclosed. In the example of FIG. 2, query system 200 may represent an example implementation of query system 10 of FIG. 1. Query system 200 may include a client application programming interface (API) 202, nodes 204A-204N (collectively, "nodes 204"), connector interfaces 206A-206N (collectively, "connector interfaces 206"), execution engine 210, compiler 212, optimizer 214, and metrics repository 216. Query system 200 may provide access to data sources 208A-208N (collectively, "data sources 208"). In the example of FIG. 2, data sources 208 may be heterogenous data sources. Each of connector interfaces 206, execution engine 210, compiler 212, and optimizer 214 may represent software having machine-readable instructions executable by processing circuitry.

Query system 200 includes a cluster of nodes, e.g., nodes 204, that interface with query system 200. In some examples, nodes 204 are part of a distributed network. Users may access nodes 204 via client interface 202 to send queries to nodes 204 of query system 200 to access data stored in one or more of data sources 208. In some examples, client interface 202 may include a web-based management console, command line interface (CLI) or other programmatic interfaces, client APIs, a graphical user interface, and/or native interfaces built using Java, Scala, C++, Python, or other languages. In some examples, nodes 204 may implement a decentralized peer-to-peer network protocol, e.g., Wireline, for users to send queries to query system 200. Examples of programmatic interfaces may include Java Database Connectivity (JDBC), Java fluent API, Sessionless HTTP (SQL), Sessionless HTTP (component), and others.

As one example in which client interface 202 implements JDBC, a query received by the client interface 202 is associated with a previously established session and user. Client interface 202 may parse SQL text to create a parse tree structure. The parse tree is traversed to produce a table name preview for connector interfaces. The parse tree is traversed to produce an operator graph, with table operators supplied by connector interfaces.

As another example in which client interface 202 implements Java fluent API, fluent-style Java code assembles a query component tree containing a mixture of textual or abstract specification elements along with executable Java elements. The query component tree is traversed to produce a table name preview for connector interfaces. The query component tree is traversed to produce an operator graph, with table operators supplied by the connector interfaces.

In yet another example in which client interface 202 implements Sessionless HTTP (SQL), session and user authentication is provided on each query. SQL text is parsed to create a parse tree structure. The parse tree is traversed to produce a table name preview for connector interfaces. The parse tree is traversed to produce an operator graph, with table operators supplied by the connector interfaces.

As another example in which client interface 202 implements Sessionless HTTP (component), session and user authentication is provided on each query. XML, text is parsed to create a parse tree structure. The parse tree is traversed to produce a table name preview for connector interfaces. The parse tree is traversed to produce an operator graph, with table operators supplied by the connector interfaces.

In some examples, one or more nodes, e.g., node 204A, referred to as a distributed query coordinator (DQC), may receive queries via client interface 202. The other nodes, e.g., nodes 204B-204N, referred to as distributed query exectors (DQEs), may perform the query execution and are used to connect to data sources 208 via connector interfaces 206. Although the example above describes node 204A operating as a DQC and nodes 204B-204N operating as a DQE, each of the nodes may operate as a DQC, a DQE, or both.

Query system 200 may include a compiler 212 that compiles incoming queries to build query plans for the incoming queries. Compiler 212 may include a Just-in-Time (JIT) compiler that compiles the incoming queries into bytecode. A query plan may include an ordered set of steps used to complete a query. That is, these steps describe the data source operations taken to create the query results. In some examples, a query plan is expressed as an abstract graph, such as a tree structure. The abstract graph may include nodes that represent operands (e.g., fetch operands) to access data stored in one or more of data sources 208. In some examples, the query plan may use an object-oriented design in which the leaf nodes (e.g., fetch operators) are supplied by connector interfaces 206 associated with respective data sources 208.

As one example, query system 200 may receive a query to access data stored in relational database (e.g., data source 208A) and non-relational database (e.g., data source 208B). Compiler 212 compiles the query and builds a query plan to utilize the native capabilities of relational database 208A and non-relational database 208B. In this example, compiler 212 may build a query plan, such as an abstract graph with a first node representing an operand to access data stored in relational database 208A and a second node representing an operand to access data stored in non-relational database 208B. More specifically, compiler 212 may reformulate the query (e.g., a neutral dialect query) into sub-queries, such as a relational database query (e.g., in SQL) including operands to access data stored in relational database 208A, and a non-relational database query (e.g., in NoSQL) including operands to access data stored in non-relational database 208B.

Execution engine 210 of query system 200 may execute the query plan generated by compiler 212. For example, execution engine 210 may push down parts of the query plan that can be executed directly by data sources 208. Continuing the example above, execution engine 210 may push down the relational database query to be executed directly by relational database 208A and may push down the non-relational database query to be executed directly by non-relational database 208B. Execution engine 210 may also execute the remainder of the query plan by pulling up data from underlying data sources 208 that is needed to complete the execution of the query. For example, execution engine 210 may receive separate sub-query result data returned from data sources 208A and 208B and integrate the data for the user.

Execution engine 210 may access the underlying data sources 208 using a plurality of connector interfaces 206 that each provide an interface to a corresponding one of data sources 208. Connector interfaces 206 are responsible for executing parts (e.g., sub-queries) of the query plan that is generated by optimizer 214 and passing the sub-query result data returned from data sources 208 to execution engine 210. In some examples, connector interfaces 206 may provide the fetch operators (e.g., as nodes of the query plan) to compiler 212 for generating the query plan to access data sources connected to the connector interfaces 206.

In some examples, connector interfaces 206 may provide metrics on tables for which they have access to compiler 212 when generating a query plan. For example, when generating a query plan, compiler 212 may identify tables to be requested by the query and survey the connector interfaces 206 to determine whether the connector interfaces 206 have access to the identified tables. In these examples, connector interfaces 206 may provide metadata (e.g., granular information of a table such as row count or generic information such as a large text file) of a data structure in its underlying data source to compiler 212 for generating the query plan. In these examples, connector interfaces 206 may include a cache or other memory to store the metadata.

In some examples, connector interfaces 206 may provide a standard American National Standards Institute (ANSI) 3-part naming interface (e.g., catalog.schema.table) to the data that is managed by the database. For example, a relational database (e.g., data source 208A) may support ANSI 3-part naming interface and connector interface 206A may use the 3-part name to identify each table. In some examples in which one or more data sources 208 do not support ANSI 3-part naming interface, connector interfaces 206 may provide missing parts of the ANSI 3-part name.

As one example, data source 208A may be, for example, a Postgres database (e.g., catalog) that is named "Sales" (e.g., schema) and includes tables named "Customers," "Items," and "Orders." A query plan may include an operand of:

select * from Postgres.Sales.Customers

Connector interface 206A may identify the table for the query for customer information by the 3-part name of <Postgres>.<Sales>.<Customers>, and receives the data extracted from the identified table. In some examples, certain data sources (e.g., data source for streaming data) may not support ANSI 3-part naming interface. In this example, connector interface 206C may provide missing parts of the ANSI 3-part name, such as catalog and schema name.

In accordance with the techniques disclosed, query system 200 may include optimizer 214 for dynamically optimizing queries for the plurality of data sources 208. For example, optimizer 214 may cause query system 200 to dynamically obtain one or more metrics of compiled queries as the compiled queries are executed and to optimize subsequent queries based on the dynamically obtained metrics. Although optimizer 214 is illustrated as a separate module, optimizer 214 may be part of any of the other modules, such as compiler 212, or implemented in a distributed environment, such as by nodes 204.

In the example of FIG. 2, optimizer 214 may cause compiler 212 to add instrumentation code when compiling queries to obtain one or more metrics as the compiled queries are executed. For example, to obtain metrics on the size of operands and/or selectivity of predicates resulting from the execution of a query, optimizer 214 may instruct compiler 212 to add a counter to a sub-query (e.g., relational database query) code to count each row returned from a relational database (or count each row returned based on a predicate). Alternatively, or additionally, optimizer 214 may cause compiler 212 to add a counter to a sub-query (e.g., non-relational database query) code to count array elements or nested arrays from a document, such as a JSON document. In other examples, to obtain metrics on the cardinality of columns of tables, optimizer 214 may cause compiler 212 to add instrumentation code to estimate the number of distinct values of a column.

Execution engine 210 may process the obtained metrics, such as tabulating the count based on execution of the compiled queries. The obtained metrics may be stored in metrics repository 216, which may include an in-memory, off-memory, local or remote storage (shown as in-memory in FIG. 2). In some examples, metrics repository 16 is a distributed information base.

When query system 200 receives a subsequent query, optimizer 214 may cause query system 200 to optimize a query plan of the subsequent query based on the obtained metrics. For example, optimizer 214 may request for metrics (e.g., row count information) stored in metrics repository 216 and determines how to optimize the subsequent query. As one example, optimizer 214 may apply decision and/or declared factors, heuristic models, machine learning models, and/or feature learning models to the obtained metrics to determine how to optimize the query plan. Decision factors may include operator cardinality, column datatype, column uniqueness, predicate selectivity, join density, plan enumeration benefit bloom filter benefit, distribution benefit, replication benefit, repartitioning benefit, connector pushdown benefit, caching benefit, function cost, evaluation order, generated class reuse or likelihood of JIT deoptimization, indexing strategy (e.g., hash vs tree, hash table format, hash function), transaction scope, transactions size or duration, transaction prioritization, and others. Declared factors may include primary key or foreign key relationships, unique declaration, declared indexes, query hints, and others. Optimizer 214 may in some examples apply Heuristic (otherwise referred to herein as "rule-of-thumb") models, Machine Learning models, and/or feature learning models. Heuristic models may include uniform approximation, polynomial approximation, and/or other heuristic models. Machine learning models may include seed learning, dynamic learning, decision-tree, Naïve Bayes classifier, K-Nearest Neighbors (KNN), Support Vector Machine (SVM), Random Forest, or other machine learning models. Feature learning models use features (e.g., variables) to build a predictive model. Features may include distribution profile, workload profile, session or user, tables, columns operators, predicate expressions, projected expressions, and other properties of queries.

In some examples, metrics repository 216 includes one or more attributes of operators. Attributes include context attributes, table attributes, column contribution attributes, and predicate digests. For example, context attributes may include the type of API (e.g., JDBC, Web, SQL, Java, etc.) that was used for the query, the user that initiated the query, time of day the query was executed, and/or workload profile (e.g., CPU load, memory usage, active users, active query count, etc.). Table attributes may include attributes for tables or streams that appear in a subgraph of a graph (e.g., query plan). The attribute is formed, for example, from a system-global "feature-ID" for the table or stream, along with any explicit query hints that apply. Column contribution attributes may include attributes for columns used in the subgraph, such as whether a column is declared a private key or foreign key, a column is declared unique, a column is a declared index column, a column is a projected expression (e.g., that the column appears directly in the output of the query), a column contributes to a projected expression, a column is used in a join predicate in the subgraph, a column is used in grouping in the subgraph, a column is used in ordering in the subgraph, and/or a column was named but not used. Predicate digests may include attributes for predicates in the subgraph in the form of a reduced "digest" indicating the shape of the predicate and the column to which the predicate applies. Magnitude comparisons (e.g., less than, greater than) are normalized to be inclusive (e.g., less than or equal to, greater than or equal to). Comparisons between columns are normalized with the lower-numbered column as primary. Comparisons with or between complex expressions are recorded as "complex" or, if the predicates involve a user defined function (UDF) are recorded as "complex with UDF"). Equality with a column having a similar name (e.g., based on a variant of Levenshtein distance) is flagged as a possible hint of a key relationship. Attributes for predicates may also include equality to another column, equality to another column with name similarity, less than another column, greater than another column, equal to a constant, less than a constant, greater than a constant, range (represented as a base value and a range), "like" or "regex" digest, other or complex predicates, and/or other or complex predicates with UDF.

As described above, optimizer 214 may cause query system 200 to optimize the current query plan or a query plan of the subsequent query based on the obtained metrics. As one example, optimizer 214 may perform predicate pushdown and constraint propagation. For example, query predicates and filter operators are relocated closer to the table operators in the query plan (e.g., graph) where possible. New predicates are inferred and propagated through the query plan.

As another example, optimizer 214 may reorder the plurality of join operands in the current query plane or the query plan of a subsequent query such that the join operand with the smallest tables is joined first and the join operand with the largest tables is joined last. For example, metrics repository 216 may store the row count of tables that were obtained when a previous query was executed. In other examples, optimizer 214 may convert outer joins to inner joins where possible. Using these metrics, optimizer 214 has knowledge of the size of tables and may reorder or convert the join operands of the query plan.

In another example, optimizer 214 may provide sub-query decorrelation and unnesting. For example, optimizer 214 may convert nested sub-queries to independent queries which are then reattached to the main query via join operators.

As yet another example, optimizer 214 may pushdown a limiting operator. For example, optimizer 214 may relocate row-limiting operators downward (e.g., closer to the table operators) toward the lowest table operator in the query plan where the rows can be limited.

In yet another example, optimizer 214 may order pushdown a row-ordering operator. For example, optimizer 214 may relocate row ordering operators downward toward the point where any required sort operation will be performed on the smallest possible input.

As another example, optimizer 214 may cause query system 200 to optimize the order of operators. For example, optimizer 214 may generate assumptions by fitting the operators or query plan to models generated from metrics measured in previous queries (or statistics provided by connector interfaces) or pre-loaded heuristic models. These assumptions may be used to establish ordering precedence and/or control the degree of plan enumeration. That is, optimizer 214 may recognize patterns by examining the features and attributes of a query itself, uses the features and attributes of the query to relate the query (or parts of the query) to information or examples previously seen, and generates assumptions based on this information and interrogates connector interfaces 206 to correct or confirm the assumptions. In this way, optimizer 214 may configure the query to: (1) gather information for subsequent queries that are the same or similar, and (2) if the assumptions are poor, starting over for all or part of the query, if possible.

As another example, optimizer 214 may cause query system 200 to condense operators of a query plan (or a portion of the query plan). For example, optimizer 214 may condense a fetch operator and an associated predicate to a single query that fetches only the predicated rows. In this example, optimizer 214 may determine, based on the size of operands (e.g., fetching size of fetching operator and predicate operator) stored in metrics repository 216, to condense the fetch operator and the associated predicate to a single query. In some examples in which connector interfaces 206 supply the leaf nodes (e.g., fetch operators) for the query plan, connector interfaces 206 may mediate the condensing operation, such as by adapting or transforming the condensed operators as needed.

In some examples, optimizer 214 may provide column optimization. For example, optimizer 214 may push expression components downward to allow maximum visibility for connector interfaces during a condensing phase.

In some examples, optimizer 214 may selectively determine whether to push a join operand in a query plan for the subsequent query to a database. In certain examples, optimizer 214 may prevent pushing a join operand to a database based on cardinality of the tables to be joined. For example, data source 208A may include tables with a large number of duplicate entries. If the join operand is pushed to data source 208A, joining the tables may result in a larger data set that data source 208A, which in some instances is less efficient in returning the data back to query system 200. In these examples, optimizer 214 may actively prevent join operands from being pushed to data sources 208.

In yet another example, optimizer 214 may identify subqueries that produce the same or similar outputs. If compatible subgraphs are found, the subgraphs are merged into a single subgraph. Eliminated subgraphs are replaced with references to the merged subgraph, and in some instances, with additional predicates, inferred predicates, or column pruning projections.

Alternatively, or additionally, optimizer 214 may cause query system 200 to optimize a query plan of the current query or a subsequent query based on assumptions generated from one or more attributes of operators. Assumptions are predictions about a subgraph based on the attributes such as the number of rows, whether the subgraph produces fewer rows than another subgraph, whether the subgraph has a higher join precedence than another subgraph, and/or whether the subgraph produces a given cardinality for a column. The assumptions may be generated using models, such as dynamically learned models, pre-loaded heuristics, elemental dynamic models having a set of previously encountered attributes and a metric (e.g., Table T with a range predicate on column C produced n rows). Assumptions may be generated by performing a series of hash lookups to find potentially applicable models. If an applicable model is found, optimizer 214 generates an assumption about the subgraph. The assumption is assigned a confidence level based on the degree of fit and a general confidence associated with the model. Some heuristic models have high confidence (e.g., because they are based on declared metadata or high confidence statistics or metrics). Others are coarse rule-of-thumb heuristics (e.g., the table with more predicates has higher join precedence). The hash lookup terminates when suitable high confidence assumptions have been generated or when default, simplistic rule-of-thumb heuristics are invoked, producing low confidence assumptions that trigger instrumentation requests. In some examples, assumptions that conflict are blended based on the confidence levels of the conflicting assumptions. When multiple dynamic models are matched during a hash lookup, the dynamic models are tagged. If the same set of elements is tagged repeatedly, the elements are coalesced. In effect, the individual elements become a training set for a clustering or regression model. This produces more accurate assumptions than when blending assumptions based on confidence levels and produces better models for query elements or arrangements of elements that are repeatedly encountered.

When an assumption is generated that concerns a single connector interface, the assumption is presented to the connector interface. The connector interface may reject the assumption, modify the assumption, or amend the confidence level of the assumption. For high value, low-confidence assumptions, a connector interface may choose to perform a data-sampling operation or data-gathering query to obtain high-confidence metrics for use in optimizing the current query and subsequent queries.

In response to optimizing a query plan, optimizer 214 may generate instrumentation requests for assumptions (e.g., high value, low confidence assumptions). Assumptions based on coarse heuristics are low-confidence, which causes queries or subgraphs that rely on the low-confidence assumptions to generate the acquisition of metrics. The type of assumption determines the metric requested. For example, an assumption of uniform join density (e.g., based on a heuristic or a loosely matched similar join) may generate a request for a measurement of the affected join.

In some examples, execution engine 210 may stop a running query or parts thereof and cause optimizer 214 to reoptimize the query when observed metrics do not comport with optimization decisions made during the initial optimization. For example, if the optimization decisions relied on low-confidence assumptions and a subgraph is restartable, one or more of the monitoring instruments (e.g., instrumentation code) to monitor the execution of a query is marked as reoptimization triggers. For example, the monitoring instruments may be augmented with an expected value or ratio. If the measured value or ratio deviates significantly from the expected value, the monitoring instrument triggers a restart.

Figure 3A:
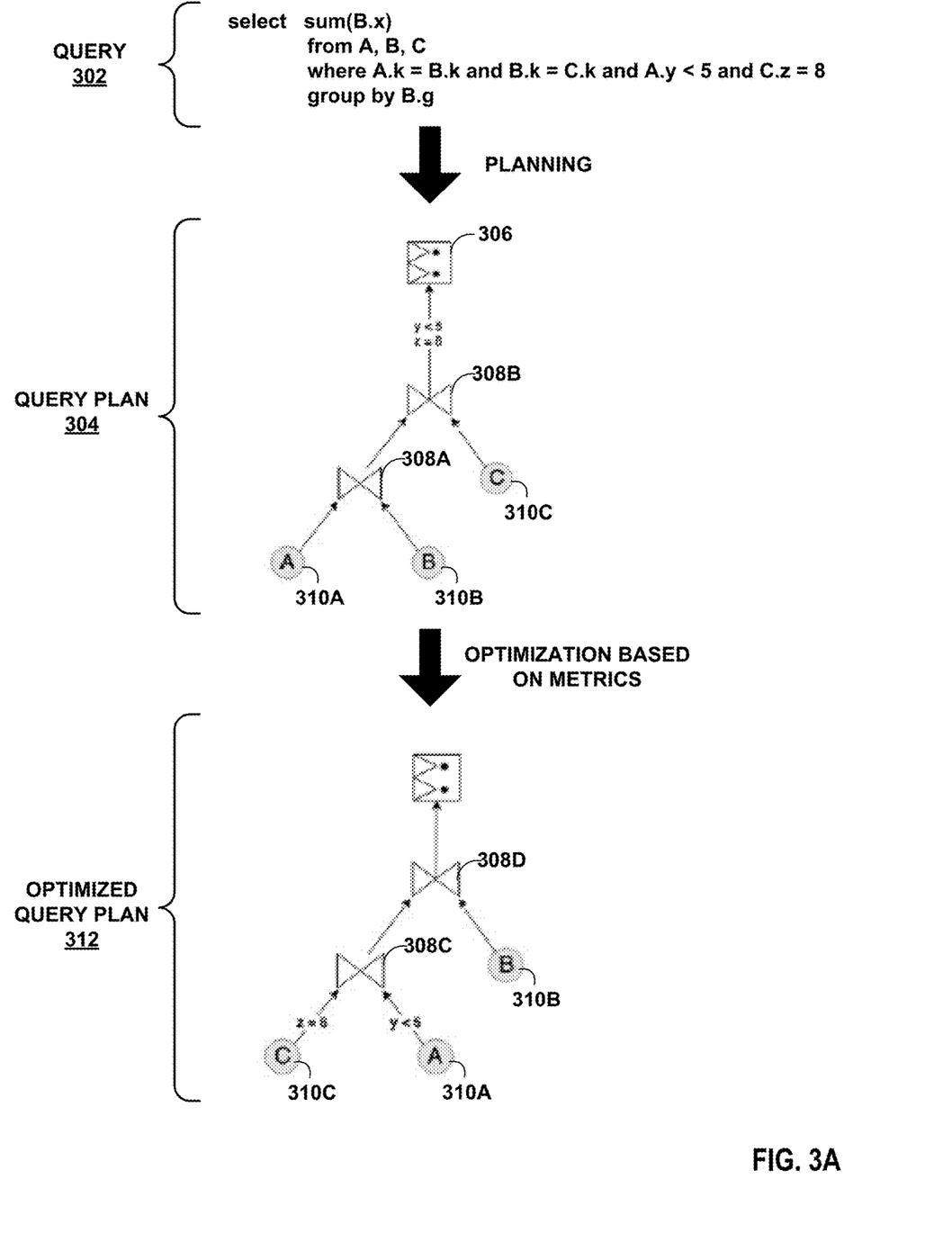
FIGS. 3A-3C are conceptual diagrams of example optimization operations, in accordance with one or more aspects of the techniques in this disclosure.
Figure 3B:
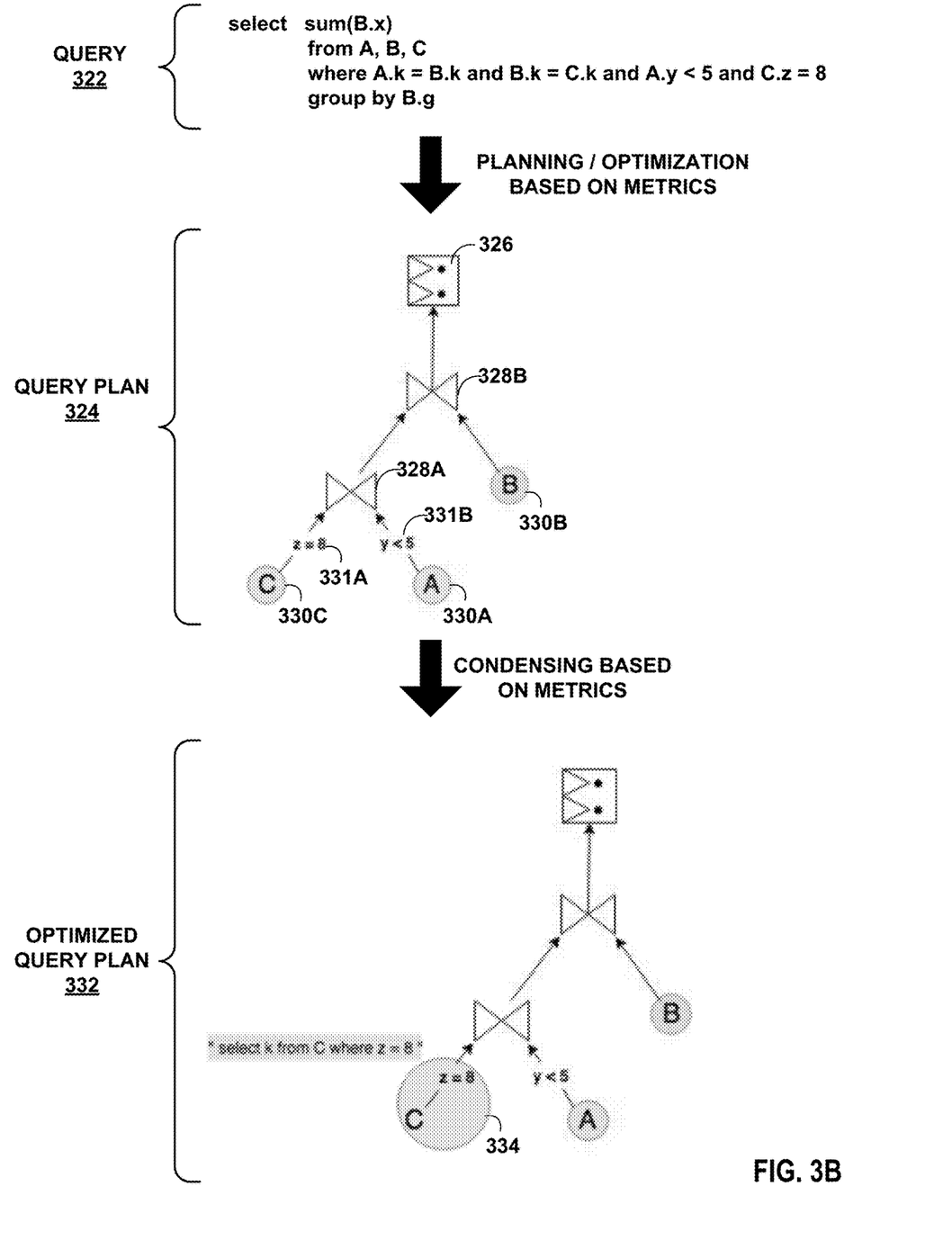
Figure 3C:
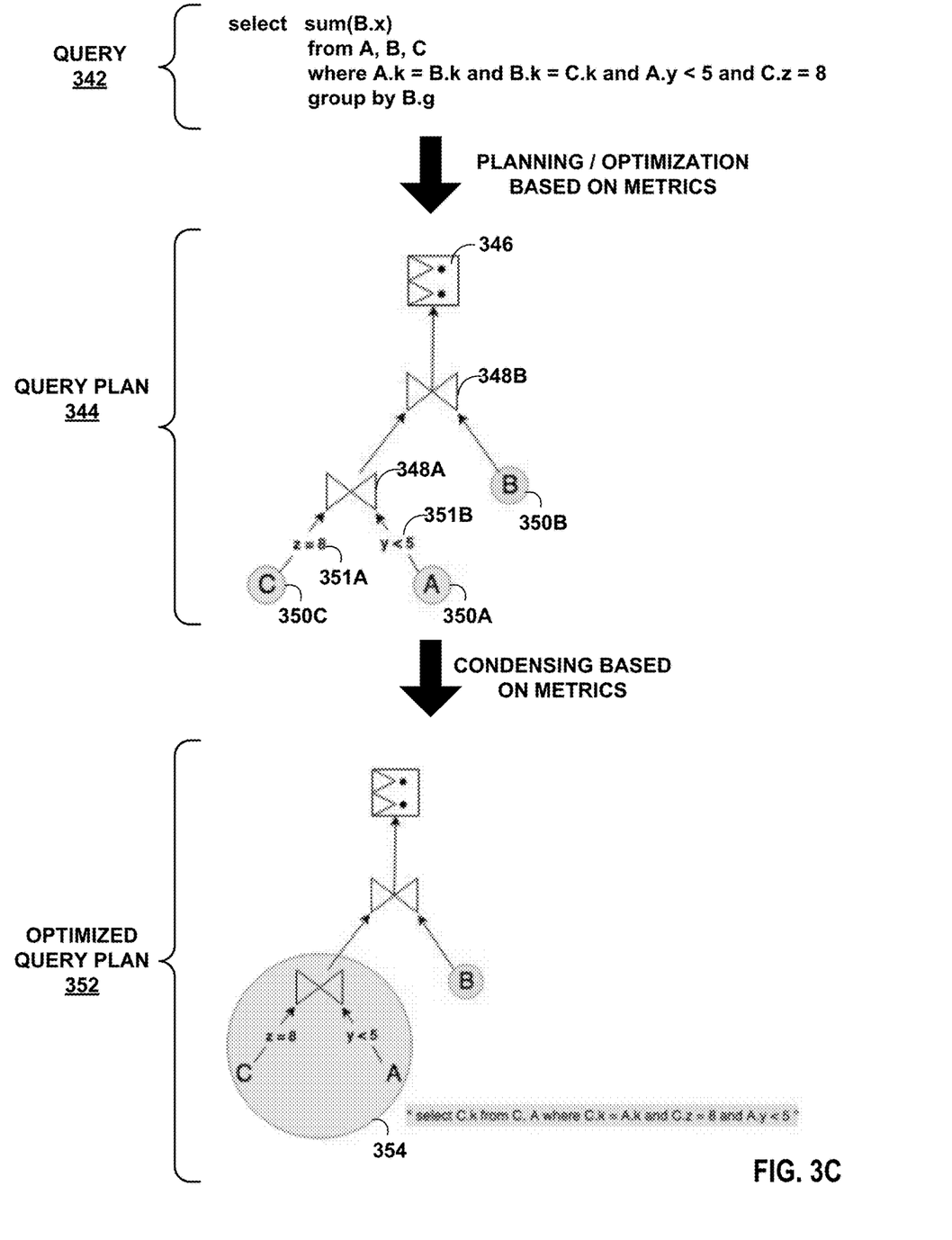

FIGS. 3A-3C are conceptual diagrams of example optimization operations, in accordance with one or more aspects of the techniques in this disclosure. FIG. 3A is a conceptual illustration of an example optimization operation to reorder operations of a query plan, in accordance with one or more aspects of the techniques in this disclosure. FIG. 3A is described with respect to query system 200 of FIG. 2.

In the example of FIG. 3A, query system 200 may receive a subsequent query 302. Compiler 212 of query system 200 compiles subsequent query 302 to build a query plan 304 for the subsequent query. In this example, query plan 304 includes a grouping operator 306 to group data returned from data sources A, B, and C, e.g., data sources 208A-208C of FIG. 2, respectively. For example, query plan 304 includes fetch operators 310A-310C (collectively, "fetch operators 310") of sub-queries generated for query 302 to access data stored in data sources 208 (e.g., via respective connector interfaces 206), respectively. Query plan 304 also includes join operators 308A-308B (collectively, "join operators 308") to join data retrieved from data sources 208. In the initial query plan 304, fetch operator 310A fetches data from data source 208A, and fetch operator 310B fetches data from data source 208B. Join operator 308A joins data returned as a result of executing fetch operators 310A, 310B. Join operator 308B subsequently joins data returned as a result of executing fetch operator 310C.

In this example, optimizer 214 may cause query system 200 to reorder the operands based on one or more metrics obtained from previous queries executing on any of data sources 208. For example, optimizer 214 may reorder join operators (illustrated as join operators 308C-308D) in query plan 304 such that a join operator with the smallest tables is joined first and the join operator with the largest tables is joined last. In this example, optimizer 214 may determine the size of the tables of data sources 208 based on a row count of tables obtained when a previous query was executed. For instance, tables of data sources 208A and 208C may have a lower row count than tables of data source 208B. Based on the size of the tables of data sources 208, optimizer 214 may reorder join operators in query plan 312 ("optimized query plan 312") such that join operator 308C first joins data returned as a result of executing fetch operators 310A and 310C, and join operator 308D then joins data returned as a result of executing fetch operator 310B.

FIG. 3B is a conceptual illustration of an example optimization operation to condense operations of a query plan, in accordance with one or more aspects of the techniques in this disclosure. FIG. 3B is described with respect to query system 200 of FIG. 2. In the example of FIG. 3B, query system 200 may receive a subsequent query 322. Compiler 212 of query system 200 compiles subsequent query 322 to build a query plan 324 for the subsequent query. In this example, query plan 324 includes a grouping operator 326 to group data returned from data sources A, B, and C, e.g., data sources 208A-208C of FIG. 2, respectively. For example, query plan 324 includes fetch operators 330A-330C (collectively, "fetch operators 330") of sub-queries generated for query 322 to access data stored in data sources 208 (e.g., via respective connector interfaces 206), respectively. The query plan 324 may also include predicate operators 331A-331B (collectively, "predicate operators 331") to access a subset of data stored in data sources 208. For example, predicate operator 331A requests access to a subset of data in data source 208C where z=8. Predicate operator 331B requests access to a subset of data in data source 208B where y<5. Query plan 324 further includes join operators 328A-328B (collectively, "join operators 328") to join data returned as a result of executing fetch operators 330 and/or predicate operators 331. For instance, join operator 328A joins data returned as a result of executing fetch operator 330C, predicate operator 331A, fetch operator 330A, and predicate operator 331B. Join operator 328B subsequently joins data returned as a result of executing fetch operator 330B.

In this example, optimizer 214 may cause query system 200 to condense the fetch operator 330C and predicate operator 331A to a single query (e.g., sub-query 334) that fetches only the predicated rows. Optimizer 214 may condense the fetch operator 330C and predicate operator 331A based on one or more metrics obtained from previous queries executing on any of data sources 208. For example, optimizer 214 may determine the size of operands, such as the fetching size of fetching operator 330C and fetching size of predicate operator 331A. Based on the size of operands, optimizer 214 may condense the predicate operator 331A (e.g., "where z=8") with the fetch operator 330C (e.g., "select k from C") to form a single sub-query 334 (e.g., "select k from C where z=8"). In this way, the predication is applied at data source 208C, thereby reducing the network traffic required to obtain data for a query, in some instances.

FIG. 3C is a conceptual illustration of another example optimization operation to condense operations of a query plan, in accordance with one or more aspects of the techniques in this disclosure. FIG. 3C is described with respect to query system 200 of FIG. 2. In the example of FIG. 3C, query system 200 may receive a subsequent query 342. Compiler 212 of query system 200 compiles subsequent query 342 to build a query plan 344 for the subsequent query. In this example, query plan 344 includes a grouping operator 346 to group data returned from data sources A, B, and C, e.g., data sources 208A-208C of FIG. 2, respectively. For example, query plan 344 includes fetch operators 350A-350C (collectively, "fetch operators 350") of sub-queries generated for query 342 to access data stored in data sources 208 (e.g., via respective connector interfaces 206), respectively. The query plan 344 may also include predicate operators 351A-351B (collectively, "predicate operators 351") to access a subset of data stored in data sources 208. For example, predicate operator 351A requests access to a subset of data in data source 208C where z=8. Predicate operator 351B requests access to a subset of data in data source 208B where y<5. Query plan 344 further includes join operators 348A-348B (collectively, "join operators 348") to join data returned as a result of executing fetch operators 350 and/or predicate operators 351. For instance, join operator 348A joins data returned as a result of executing fetch operator 350C, predicate operator 351A, fetch operator 350A, and predicate operator 351B. Join operator 348B subsequently joins data returned as a result of executing fetch operator 350B.

In this example, optimizer 214 may cause query system 200 to condense fetch operators 350A, 350C and predicate operators 351A, 351B to a single query (e.g., sub-query 354) that fetches only the predicated rows. Optimizer 214 may condense fetch operators 350A, 350C and predicate operators 351A, 351B based on one or more metrics obtained from previous queries executing on any of data sources 208. For example, optimizer 214 may determine the size of operands, such as the fetching size of fetching operators 350A, 350C and fetching size of predicate operators 351A, 351B. Based on the size of operands, optimizer 214 may condense the fetch operators 350A, 350C, predicate operators 351A, 351B, and join operator 348A to form a single operator for sub-query 354 (e.g., "select C.k from C, A where C.k–A.k and C.z–8 and A.y<5") to access data sources 208A and 208C.

Figure 4:
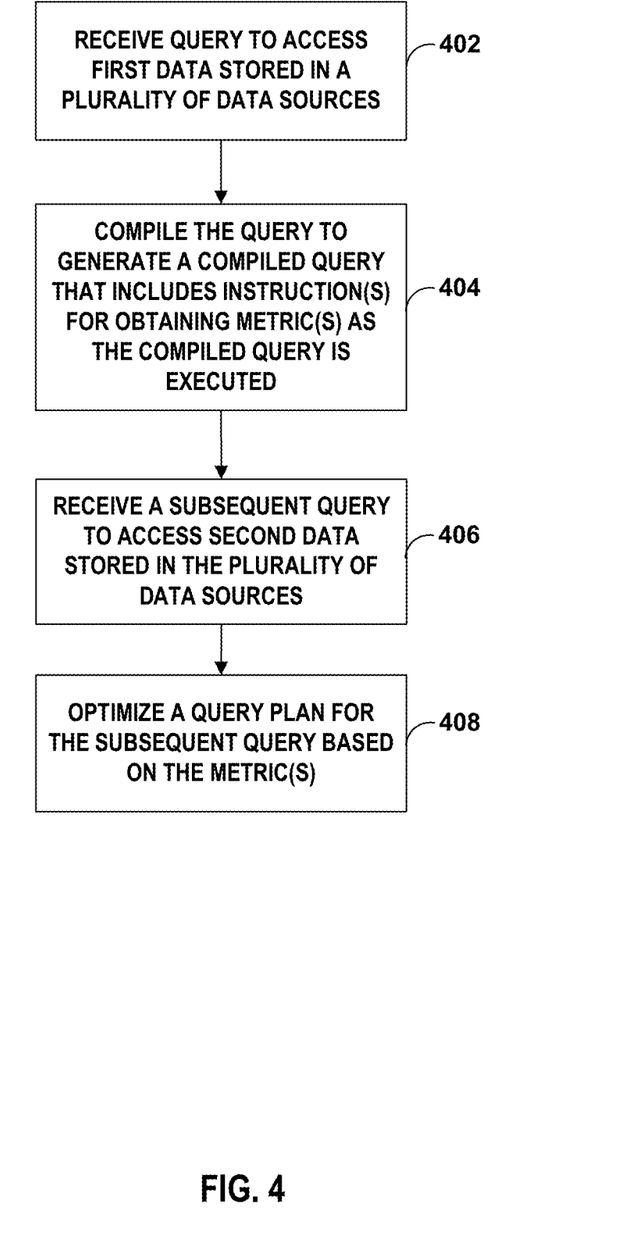
FIG. 4 is a flowchart illustrating operation of a query system configured for dynamically optimizing queries, in accordance with one or more aspects of the techniques disclosed.

FIG. 4 is a flowchart illustrating operation of a query system configured for dynamically optimizing queries, in accordance with one or more aspects of the techniques disclosed. FIG. 4 is described with respect to the example query system 200 described in FIG. 2.

In the example of FIG. 4, query system 200 receives a query to access first data stored in a plurality of data sources (402). For example, a user may specify a query based on a neutral dialect, such as SQL. One or more nodes 204 that interface with query system 200 may receive the query to access data stored in one or more of data sources 208.

Query system 200 compiles the query to generate a compiled query that includes one or more instructions for obtaining one or more metrics as the compiled query is executed (404). For example, compiler 212 of query system 200 may compile the query to build a query plan to utilize the native capabilities of the data sources 208. More specifically, compiler 212 may reformulate the query (e.g., neutral dialect query) into sub-queries (e.g., relational/non-relational database query) to access data stored in a plurality of data sources 208. Optimizer 214 may cause compiler 212 to add instrumentation code (e.g., a counter) when compiling queries to obtain one or more metrics as the compiled queries are executed.

Query system 200 obtains the one or more metrics and uses the metrics for executions of portions of the compiled query at one or more of the data sources. For example, execution engine 210 of query system 200 may execute the query plan generated by compiler 212. For example, execution engine 210 may distribute the sub-queries in parallel to multiple data sources 208 via connector interfaces 206 that each provide an interface to a corresponding one of data sources 208. Connector interfaces 206 are responsible for executing parts (e.g., sub-queries) of the query plan that is generated by optimizer 214 and passing the sub-query result data returned from data sources 208 to execution engine 210.

When query system 200 receives a subsequent query to access second data stored in the plurality of data sources (406), query system 200 optimizes a query plan for the subsequent query based on the one or more metrics (408). For example, when query system 200 receives a subsequent query, compiler 212 of query system 200 may compile the subsequent query to generate a query plan for subsequent query that differs from a query plan that query system 200 would generate absent the metrics. For example, based on a dynamically-obtained metric for data sources 208, optimizer 214 may cause the query system 200 to: (1) select a particular data source 8 for a data set; (2) determine a type or ordering of tasks within a sub-query sent to a data source 8; (3) determine to process one or more tasks for a query by query system 10 rather than by a data source 8; (4) determine an ordering of tasks for a query or sub-query, such as join operations; (5) determine whether to condense operators for a query or sub-query; (6) or other determinations that affects the query plan and the compiled query generated by the query system 10, such as to selectively determine whether to push a join operand to the data source.

Figure 5:
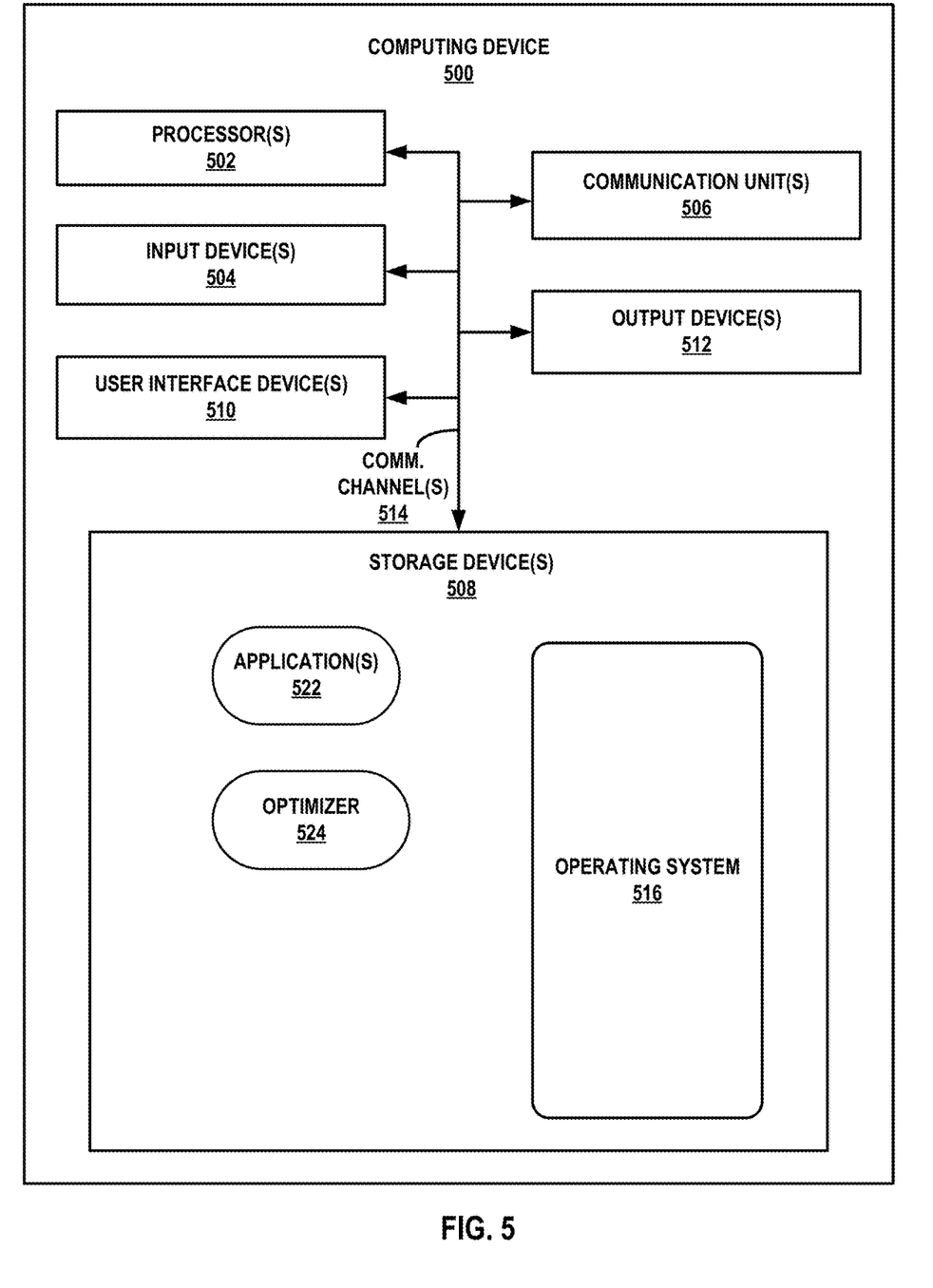
FIG. 5 is a block diagram of an example computing device that operates in accordance with one or more techniques of the present disclosure.

FIG. 5 is a block diagram of an example computing device 500 that operates in accordance with one or more techniques of the present disclosure. FIG. 5 may illustrate a particular example of a computing device that includes one or more processors 502 for executing any one of nodes 204 of FIG. 2, or any other computing device described herein. In the example of FIG. 5, computing device 500 may be a workstation, server, mainframe computer, notebook or laptop computer, desktop computer, tablet, smartphone, feature phone, or other programmable data processing apparatus of any kind. Computing device 500 of FIG. 5 may represent any node of query system 200 as depicted in FIG. 2, for example. Other examples of computing device 500 may be used in other instances. Although shown in FIG. 5 as a stand-alone computing device 500 for purposes of example, a computing device may be any component or system that includes one or more processors or other suitable computing environment for executing software instructions and, for example, need not necessarily include one or more elements shown in FIG. 5 (e.g., communication units 506; and in some examples components such as storage device(s) 508 may not be in the computing device 500).

As shown in the specific example of FIG. 5, computing device 500 includes one or more processors 502, one or more input devices 504, one or more communication units 506, one or more output devices 512, one or more storage devices 508, and one or more user interface (UI) devices 510. Computing device 500, in one example, further includes one or more applications 522 and operating system 516 that are executable by computing device 500. Each of components 502, 504, 506, 508, 510, and 512 are coupled (physically, communicatively, and/or operatively) for inter-component communications. In some examples, communication channels 514 may include a system bus, a network connection, an inter-process communication data structure, or any other method for communicating data. As one example, components 502, 504, 506, 508, 510, and 512 may be coupled by one or more communication channels 514.

Processors 502, in one example, are configured to implement functionality and/or process instructions for execution within computing device 500. For example, processors 502 may be capable of processing instructions stored in storage device 508. Examples of processors 502 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 508 may be configured to store information within computing device 500 during operation. Storage device 508, in some examples, is described as a computer-readable storage medium. In some examples, storage device 508 is a temporary memory, meaning that a primary purpose of storage device 508 is not long-term storage. Storage device 508, in some examples, is described as a volatile memory, meaning that storage device 508 does not maintain stored contents when the computer is turned off. Examples of volatile memories include random access memories (RAM), dynamic random access memories (DRAM), static random access memories (SRAM), and other forms of volatile memories known in the art. In some examples, storage device 508 is used to store program instructions for execution by processors 502. Storage device 508, in one example, is used by software or applications running on computing device 500 to temporarily store information during program execution.

Storage devices 508, in some examples, also include one or more computer-readable storage media. Storage devices 508 may be configured to store larger amounts of information than volatile memory. Storage devices 508 may further be configured for long-term storage of information. In some examples, storage devices 508 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 500, in some examples, also includes one or more communication units 506. Computing device 500, in one example, utilizes communication units 506 to communicate with external devices via one or more networks, such as one or more wired/wireless/mobile networks. Communication units 506 may include a network interface card, such as an Ethernet card, an optical transceiver, a radio frequency transceiver, or any other type of device that can send and receive information. Other examples of such network interfaces may include 3G, 4G, 5G and WiFi radios. In some examples, computing device 500 uses communication unit 506 to communicate with an external device.

Computing device 500, in one example, also includes one or more user interface devices 510. User interface devices 510, in some examples, are configured to receive input from a user through tactile, audio, or video feedback. Examples of user interface devices(s) 510 include a presence-sensitive display, a mouse, a keyboard, a voice responsive system, video camera, microphone or any other type of device for detecting a command from a user. In some examples, a presence-sensitive display includes a touch-sensitive screen.

One or more output devices 512 may also be included in computing device 500. Output device 512, in some examples, is configured to provide output to a user using tactile, audio, or video stimuli. Output device 512, in one example, includes a presence-sensitive display, a sound card, a video graphics adapter card, or any other type of device for converting a signal into an appropriate form understandable to humans or machines. Additional examples of output device 512 include a speaker, a cathode ray tube (CRT) monitor, a liquid crystal display (LCD), or any other type of device that can generate intelligible output to a user.

Computing device 500 may include operating system 516. Operating system 516, in some examples, controls the operation of components of computing device 500. For example, operating system 516, in one example, facilitates the communication of one or more applications 522 with processors 502, communication unit 506, storage device 508, input device 504, user interface device 510, and output device 512. Application 522 may also include program instructions and/or data that are executable by computing device 500.

Optimizer 524 may include instructions for causing computing device 500 to perform the techniques described in the present disclosure with respect to optimizer 14 of FIG. 1 and optimizer 214 of FIG. 2. As one example, optimizer 524 may include instructions that cause computing device 500 to dynamically optimize queries in accordance with the techniques of this disclosure.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components.

The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units or engines is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A method performed by a query system, the method comprising:
    receiving a query to access first data stored in a plurality of data sources;
    compiling the query to generate a plurality of compiled queries that are each used to retrieve data from a corresponding data source of the plurality of data sources, wherein compiling the query to generate the plurality of compiled queries comprises determining a confidence level of one or more assumptions about one or more attributes of the query, and based on the determined confidence level, including one or more instructions within one or more compiled queries of the plurality of compiled queries, wherein the
    one or more instructions are for obtaining, as a particular compiled query of the plurality of compiled queries is executed, one or more metrics for executions of portions of the particular compiled query at the corresponding data source of the plurality of data sources;
    receiving a subsequent query to access second data stored in the plurality of data sources; and
    optimizing a query plan for the subsequent query based on the one or more metrics obtained from the execution of each of the plurality of compiled queries.

2. The method of claim 1, wherein the one or more metrics comprises size of an operand, selectivity of a predicate, and cardinality of a table.

3. The method of claim 2,
    wherein the size of the operand comprises a number of rows of a table returned resulting from the execution of the query, and wherein the one or more instructions for obtaining one or more metrics comprises a count function to count the number of rows of the table returned from the execution of the query.

4. The method of claim 2,
wherein the selectivity of the predicate comprises a subset of a data set identified by a condition applied to rows of the table, and
wherein the one or more instructions for obtaining one or more metrics comprises a count function to count the number of rows of the table returned based on the predicate resulting from the execution of the query.

5. The method of claim 2,
wherein the cardinality of the table comprises a number of duplicate entries of a column of the table, and
the one or more instructions for obtaining one or more metrics comprises a count function to count the number of duplicate entries of the column of the table.

6. The method of claim 1, wherein optimizing the query plan for the subsequent query comprises adding a join operand for tables of the plurality of data sources.

7. The method of claim 1, wherein optimizing the query plan for the subsequent query comprises reordering a series of join operands of the subsequent query.

8. The method of claim 1, wherein optimizing the query plan for the subsequent query comprises:
determining whether a join operand of the subsequent query is optimal; and
rejecting, in response to determining that the join operand of the subsequent query is not optimal, an implementation of the join operand of the subsequent query.

9. The method of claim 1, wherein the plurality of data sources comprises a plurality of heterogenous data sources that comprise at least one relational database and one non-relational database.

10. The method of claim 1, wherein compiling the query comprises a Just-In-Time compilation that uses recently obtained metrics.

11. The method of claim 1, wherein optimizing the query plan for the subsequent query based on the one or more metrics comprises optimizing the query plan based on one or more decision factors comprising operator cardinality, column data type, column uniqueness, predicate selectivity, join density, plan enumeration benefit, bloom filter benefit, distribution benefit, replication benefit, repartitioning benefit, connector pushdown benefit, caching benefit, function cost, evaluation order, generated class reuse, likelihood of compiler deoptimization, indexing strategy, transaction scope, transaction size, transaction duration, and transaction prioritization.

12. The method of claim 1, wherein optimizing the query plan for the subsequent query based on the one or more metrics comprises optimizing the query plan based on one or more declared factors comprising primary key relationships, foreign key relationship, unique declaration, declared indexes, and query hints.

13. The method of claim 1, wherein optimizing the query plan for the subsequent query based on the one or more metrics comprises optimizing the query plan based on one or more heuristic operator models comprising uniform approximation and polynomial approximation.

14. The method of claim 1, wherein optimizing the query plan for the subsequent query based on the one or more metrics comprises optimizing the query plan based on one or more learning operator models comprising seed learning, dynamic learning, decision-tree, Naïve Bayes classifier, K-Nearest Neighbors (KNN), Support Vector Machine (SVM), and Random Forest.

15. The method of claim 1, wherein optimizing the query plan for the subsequent query based on the one or more metrics comprises optimizing the query plan based on one or more learning models of features comprising distribution profile, workload profile, session or user, tables, columns operators, predicate expressions, and projected expressions.

16. A query system comprising:
processing circuitry;
an interface comprising instructions executable by the processing circuitry and configured to receive a query to access first data stored in a plurality of data sources;
a plurality of connector interfaces, each of the plurality of connector interfaces comprising instructions executable by the processing circuitry and configured to interface with one of the plurality of data sources;
a compiler comprising instructions executable by the processing circuitry and configured to compile the query to generate a plurality of compiled queries that are each used to retrieve data from a corresponding data source of the plurality of data sources, wherein to compile the query to generate the plurality of compiled queries, the compiler is configured to determine a confidence level of one or more assumptions about one or more attributes of the query, and based on the determined confidence level, include one or more instructions within one or more compiled queries of the plurality of compiled queries, wherein the one or more instructions are for obtaining, as a particular compiled query of the plurality of compiled queries is executed, one or more metrics for executions of portions of the particular compiled query at the corresponding data source of the plurality of data sources; and
an optimizer comprising instructions executable by the processing circuitry and configured to optimize, in response to the interface receiving a subsequent query to access second data stored in the plurality of data sources, a query plan for the subsequent query based on the one or more metrics obtained from the execution of each of the plurality of compiled queries.

17. The query system of claim 16, wherein the plurality of connector interfaces are each further configured to:
execute sub-queries of the query plan on the plurality of data sources; and
return result data of the sub-queries from the plurality of data sources.

18. The query system of claim 16, wherein, to optimize the query plan for the subsequent query based on the one or more metrics, the optimizer is further configured to:
optimize the query plan based on one or more decision factors comprising operator cardinality, column data type, column uniqueness, predicate selectivity, join density, plan enumeration benefit, bloom filter benefit, distribution benefit, replication benefit, repartitioning benefit, connector pushdown benefit, caching benefit, function cost, evaluation order, generated class reuse, likelihood of compiler deoptimization, indexing strategy, transaction scope, transaction size, transaction duration, and transaction prioritization.

19. The query system of claim 16, wherein, to optimize the query plan for the subsequent query based on the one or more metrics, the optimizer is further configured to:
optimize the query plan based on at least one of: (1) one or more declared factors comprising primary key relationships, foreign key relationship, unique declaration, declared indexes, and query hints; (2) one or more heuristic operator models comprising uniform approximation and polynomial approximation; (3) one or more learning operator models comprising seed learning, dynamic learning, decision-tree, Nave Bayes classifier, K-Nearest Neighbors (KNN), Support Vector Machine (SVM), and Random Forest; and (4) one or more learning models of features comprising distribution profile, workload profile, session or user, tables, columns operators, predicate expressions, and projected expressions.

20. A non-transitory computer-readable medium comprising instructions for causing one or more programmable processors to:
   receive a query to access first data stored in a plurality of data sources;
   compile the query to generate a plurality of compiled queries that are each used to retrieve data from a corresponding data source of the plurality of data sources, wherein to compile the query to generate the plurality of compiled queries, the instructions further cause the one or more programmable processors to determine a confidence level of one or more assumptions about one or more attributes of the query, and based on the determined confidence level, include one or more instructions within one or more compiled queries of the plurality of compiled queries, wherein the one or more instructions are for obtaining, as a particular compiled query of the plurality of compiled queries is executed, one or more metrics for executions of portions of the particular compiled query at the corresponding data structure of the plurality of data sources;
   receive a subsequent query to access second data stored in the plurality of data sources; and
   optimize a query plan for the subsequent query based on the one or more metrics obtained from the execution of each of the plurality of compiled queries.

\* \* \* \* \*